(12) United States Patent
Chen et al.

(10) Patent No.: US 11,843,304 B2
(45) Date of Patent: *Dec. 12, 2023

(54) ELECTRIC ASSEMBLY AND VEHICLE HAVING THE SAME

(71) Applicant: BYD COMPANY LIMITED, Guangdong (CN)

(72) Inventors: Guangquan Chen, Shenzhen (CN); Daqi Chen, Shenzhen (CN); Longfei Wei, Shenzhen (CN); Xin Wen, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/110,254

(22) Filed: Feb. 15, 2023

(65) Prior Publication Data

US 2023/0198333 A1 Jun. 22, 2023

Related U.S. Application Data

(63) Continuation of application No. 16/969,163, filed as application No. PCT/CN2019/073415 on Jan. 28, 2019, now Pat. No. 11,611,258.

(30) Foreign Application Priority Data

Feb. 12, 2018 (CN) .......................... 201810146443.X
Feb. 12, 2018 (CN) .......................... 201820254940.7

(51) Int. Cl.
*H02K 5/16* (2006.01)
*H02K 7/00* (2006.01)
*H02K 9/19* (2006.01)

(52) U.S. Cl.
CPC ............... *H02K 5/16* (2013.01); *H02K 7/003* (2013.01); *H02K 7/006* (2013.01); *H02K 9/19* (2013.01)

(58) Field of Classification Search
CPC .......... H02K 5/16; H02K 7/003; H02K 7/006; H02K 9/19
(Continued)

(56) References Cited

U.S. PATENT DOCUMENTS 11,611,258 B2 * 3/2023 Chen ...................... H02K 7/006
2016/0020657 A1 1/2016 Hattori et al.

FOREIGN PATENT DOCUMENTS

CN 201250892 Y 6/2009
CN 202629021 U 12/2012
(Continued)

OTHER PUBLICATIONS

International Search Report and Written Opinion for Application No. PCT/CN2019/073415, dated Mar. 15, 2019, 6 pages.

*Primary Examiner* — Terrance L Kenerly

(57) ABSTRACT

An electric assembly includes: a box assembly, a motor, and a transmission. A mounting plate is disposed in the box assembly and divides a space within the box assembly into a motor holding cavity and a transmission holding cavity arranged along an axial direction of a motor shaft. The mounting plate has a shaft via-hole making the motor holding cavity and the transmission holding cavity be in communication. The motor is disposed in the motor holding cavity. The transmission is disposed in the transmission holding cavity. The motor is power-coupled to the transmission. At least one of a surface of the mounting plate facing the motor and a surface of the mounting plate facing the transmission is provided with ribs including strip-shaped ribs extending along a radial direction of the motor. Heights (Continued)

of the strip-shaped ribs decrease from a center portion of the mounting plate to a periphery portion of the mounting plate.

20 Claims, 13 Drawing Sheets

(58) Field of Classification Search
USPC .......................................................... 310/90
See application file for complete search history.

(56) References Cited

FOREIGN PATENT DOCUMENTS

| | | | |
|---|---|---|---|
| CN | 203617837 U | 5/2014 | |
| CN | 204013009 U | 12/2014 | |
| CN | 204749857 U | 11/2015 | |
| CN | 204886545 U | 12/2015 | |
| CN | 103795183 B | 8/2016 | |
| CN | 106100198 A | 11/2016 | |
| CN | 205715465 U | 11/2016 | |
| CN | 206623680 U | 11/2017 | |
| CN | 107458202 A | 12/2017 | |
| CN | 107650675 A | 2/2018 | |
| DE | 102010008584 A1 | 8/2011 | |
| DE | 112014001112 T5 | 12/2015 | |
| DE | 102015217441 A1 | 3/2016 | |
| DE | 112015006071 T5 | 10/2017 | |
| EP | 2213804 A2 | 8/2010 | |
| JP | WO2012111411 | * 8/2023 | ............... H02K 5/06 |
| WO | 2007025527 A1 | 3/2007 | |
| WO | 2013069774 A1 | 5/2013 | |
| WO | 2014125856 A1 | 8/2014 | |
| WO | 2015/144528 A1 | 10/2015 | |
| WO | 2016006361 A1 | 1/2016 | |
| WO | 2016110519 A1 | 7/2016 | |
| WO | 2017054687 A1 | 4/2017 | |

* cited by examiner

ELECTRIC ASSEMBLY AND VEHICLE HAVING THE SAME

CROSS-REFERENCE TO RELATED APPLICATIONS

This application is a continuation application of U.S. patent application Ser. No. 16/969,163, filed on Aug. 11, 2020, which is a national phase entry under 35 U.S.C. § 371 of International Patent Application No. PCT/CN2019/073415, filed on Jan. 28, 2019, which is based on and claims priority to and benefits of Chinese Patent Applications No. 201810146443.X and 201820254940.7, both filed on Feb. 12, 2018. The content of all of the above-identified applications is incorporated herein by reference in their entirety.

FIELD

The present invention relates to the field of vehicle manufacturing technologies and, specifically, to an electric assembly and a vehicle having the electric assembly.

BACKGROUND

A motor assembly, a transmission assembly, and a controller assembly individually disposed are used in a vehicle in the related art. The motor assembly and the transmission assembly are connected together through a bolt. Box assemblies at connection locations have relatively large wall thicknesses and waste space; there are many and bulky components; the loss is high; each assembly occupies a relatively large space; the structure is insufficiently compact; and mounting and maintenance are difficult. Thus, costs are relative relatively high, and the entire mass is large, which affects the endurance capability of the entire vehicle.

SUMMARY

The present disclosure aims to resolve at least one of the technical problems existing in the prior art. For this purpose, the present disclosure proposes an electric assembly, where the electric assembly has advantages such as a compact structure and a high integration level.

The present disclosure further provides a vehicle having the electric assembly.

To achieve the foregoing objective, according to an embodiment of a first aspect of the present disclosure, an electric assembly is proposed. The electric assembly includes: a box assembly, where a mounting plate is disposed in the box assembly, the mounting plate divides a space within the box assembly into a motor holding cavity and a transmission holding cavity that are arranged along an axial direction of a motor shaft, and the mounting plate has a shaft via-hole making the motor holding cavity and the transmission holding cavity be in communication with each other; a motor, where the motor is disposed in the motor holding cavity; and a transmission, where the transmission is disposed in the transmission holding cavity, and the motor is power-coupled to the transmission.

Additionally, the electric assembly according to the foregoing embodiment of the present disclosure may further have the following additional technical characteristics.

According to an embodiment of the present disclosure, at least one of a surface of the mounting plate facing the motor and a surface of the mounting plate facing the transmission is provided with ribs.

According to an embodiment of the present disclosure, the ribs divide a space between the mounting plate and the motor into a plurality of cavities.

According to an embodiment of the present disclosure, a maximum distance between the motor and the mounting plate is less than a preset distance.

According to an embodiment of the present disclosure, the ribs include an annular rib extending along a circumferential direction of the motor.

According to another embodiment of the present disclosure, the ribs include strip-shaped ribs extending along a radial direction of the motor, the strip-shaped ribs are spaced apart along a circumferential direction of the mounting plate.

According to an embodiment of the present disclosure, heights of at least a part of the strip-shaped ribs relative to the mounting plate gradually decrease from a center portion of the mounting plate to a periphery portion of the mounting plate.

According to an embodiment of the present disclosure, the box assembly includes a transmission box and a motor box, the transmission box includes a front box and a rear box, the motor box includes a motor housing and a motor backend cover, the front box and the motor housing are disposed adjacent to each other, and the mounting plate is a part of the front box or a part of the motor housing.

According to an embodiment of the present disclosure, the front box and the motor housing are integrally formed or detachably connected.

According to an embodiment of the present disclosure, the box assembly includes a transmission box and a motor box, the transmission box includes a front box and a rear box, the motor box includes a motor frontend cover, a motor housing and a motor backend cover, and the mounting plate is a part of the front box or a part of the motor frontend cover.

According to another embodiment of the present disclosure, the motor frontend cover and the front box are integrally formed, and the motor housing and the motor frontend cover are detachably connected.

According to an embodiment of the present disclosure, one or more of a first connection rib, a second connection rib and a third connection rib are connected between an outer surface of the front box and an outer surface of the motor housing, the first connection rib is connected between an upper end face of the outer surface of the motor housing and an upper end face of the outer surface of the front box, the second connection rib is connected between a lower end face of the outer surface of the motor housing and a lower end face of the outer surface of the front box, and the third connection rib is located between the first connection rib and the second connection rib.

According to an embodiment of the present disclosure, the electric assembly further includes a bearing, where the bearing is sleeved over the motor shaft and is located between the motor shaft and a motor housing.

According to an embodiment of the present disclosure, the bearing is located between a main shaft of the transmission and a stator of the motor in the axial direction of the motor shaft.

According to an embodiment of the present disclosure, the electric assembly further includes a plurality of bearings including the bearing, where the plurality of bearings are respectively sleeved over the motor shaft and the main shaft and are spaced apart along the axial direction of the motor shaft.

According to an embodiment of the present disclosure, the plurality of bearings include a first bearing, a second bearing, and a third bearing, the first bearing and the second bearing are respectively disposed adjacent to two ends of the main shaft, and the third bearing is disposed adjacent to one end of the motor shaft away from the main shaft.

According to an embodiment of the present disclosure, the third bearing is disposed between the box assembly and one end of the motor shaft away from the transmission, the first bearing is disposed between the box assembly and one end of the main shaft away from the motor, and the second bearing is disposed between the box assembly and at least one of one end of the motor shaft close to the main shaft and one end of the main shaft close to the motor shaft.

According to an embodiment of the present disclosure, the second bearing is sleeved over the main shaft and is located on an overlap between the main shaft and the motor shaft in the axial direction of the motor shaft.

According to another embodiment of the present disclosure, the electric assembly further includes a fourth bearing, where the fourth bearing is sleeved over the motor shaft and is located between the motor shaft and the motor housing in the axial direction of the motor shaft.

According to an embodiment of the present disclosure, the fourth bearing is located between the main shaft of the transmission and a stator of the motor.

According to an embodiment of the present disclosure, an outer surface of the motor housing is provided with reinforcing ribs arranged along the outer surface of the motor housing.

According to an embodiment of a second aspect of the present disclosure, a vehicle is proposed. The vehicle includes the electric assembly according to the embodiment of the first aspect of the present disclosure.

In the vehicle according to this embodiment of the present disclosure, the electric assembly according to the embodiment of the first aspect of the present disclosure is used, where the electric assembly has advantages such as a compact structure and a high integration level.

The additional aspects and advantages of the present disclosure will be provided in the following description, and some of the additional aspects and advantages will become clear in the following description or be understood through practice of the present disclosure.

BRIEF DESCRIPTION OF THE DRAWINGS

The foregoing and/or additional aspects and advantages of the present disclosure become clearer and easily understood in descriptions of the embodiments with reference to the following accompanying drawings.

Figure 1:
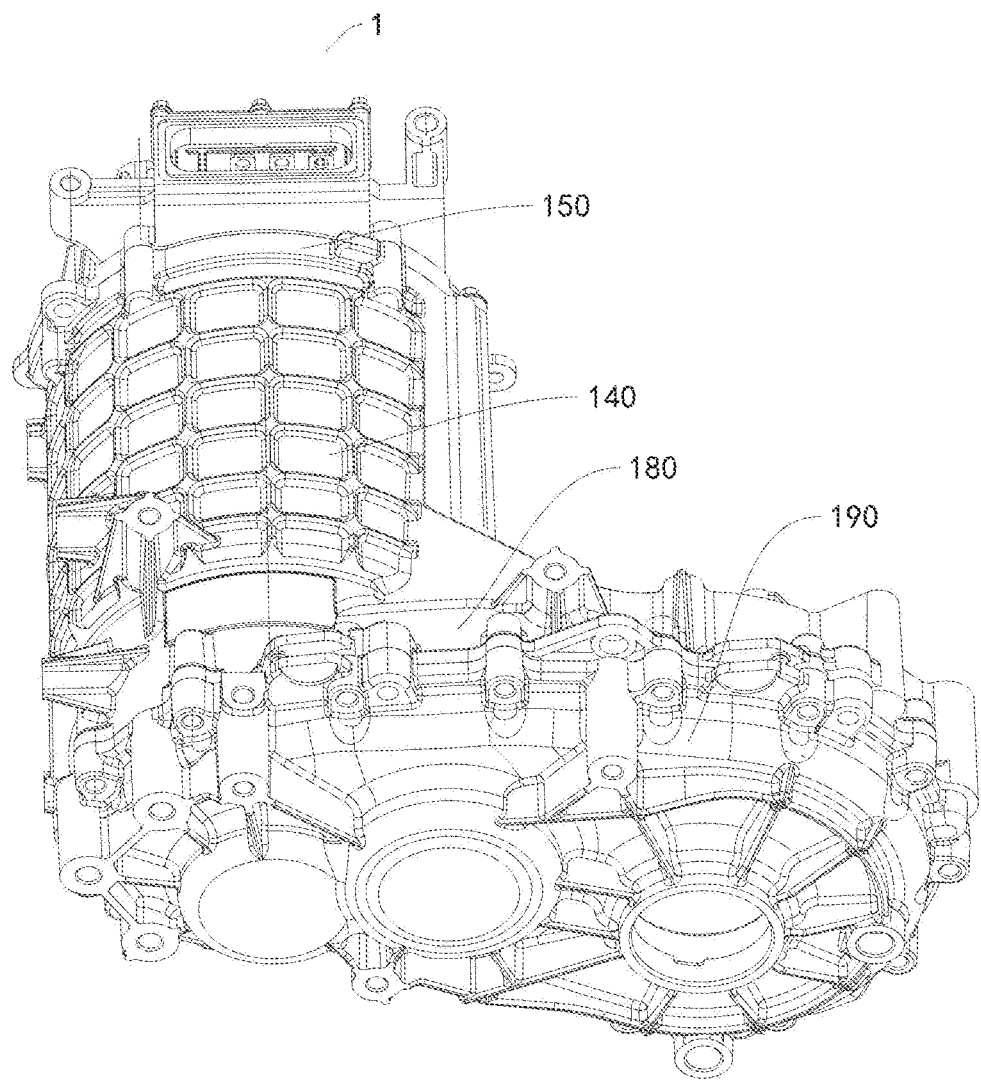
FIG. 1 is a schematic structural diagram of an electric assembly according to an embodiment of the present disclosure.

Reference numerals of the accompanying drawing: electric assembly 1; box assembly 100; transmission box 101; motor box 102; motor holding cavity 110; transmission holding cavity 120; shaft via-hole 130; motor housing 140; reinforcing rib 141; front box 180; first connection rib 181; second connection rib 182; third connection rib 183; rear box 190; motor backend cover 150; motor frontend cover 170; mounting plate 160; strip-shaped rib 161; cavity 162; annular rib 163; motor 200; motor shaft 210; outer spline 211; main shaft 300; shaft hole 310; inner spline 311; oil baffle 320; oil storage cavity 330; seal retainer ring 340; air vent 350; transmission 400; first gear 410; second gear 420; third gear 430; differential assembly 440; transmission shaft 450; first bearing 510; second bearing 520; third bearing 530; fourth bearing 540; vehicle 10.

DETAILED DESCRIPTION

The following describes embodiments of the present disclosure in detail. Examples of the embodiments are shown in the accompanying drawings. The same or similar elements and the elements having same or similar functions are denoted by like reference numerals throughout the descriptions. The following embodiments described with reference to the accompanying drawings are exemplary, and are only to describe the present disclosure and cannot be construed as limiting the present disclosure.

An electric assembly according to an embodiment of the present disclosure is described below with reference to the accompanying drawings.

As shown in FIG. 1 to FIG. 13, the electric assembly 1 according to this embodiment of the present disclosure includes a box assembly 100, a motor 200, and a transmission 400.

An mounting plate 160 is disposed in the box assembly 100, the mounting plate 160 divides a space within the box assembly 100 into a motor holding cavity 110 and a transmission holding cavity 120 that are arranged along an axial direction of a motor shaft 210, and the mounting plate 160 has a shaft via-hole 130 making the motor holding cavity 110 and the transmission holding cavity 120 be in communication with each other. The motor 200 is disposed in the motor holding cavity 110. The transmission 400 is disposed in the transmission holding cavity 120, and the motor 200 is power-coupled to the transmission 400.

In the electric assembly 1 according to this embodiment of the present disclosure, the motor 200 and the transmission 400 are disposed in the box assembly 100. Compared with the motor assembly in the related art in which the front box of the transmission and the frontend cover of the motor are connected, the motor 200 and the transmission 400 share a box assembly 100, to implement the integrated design of the electric assembly 1, which not only may leave out a structure in which a plurality of box assemblies 100 are disposed, but also may leave out a bolt required to connect the motor assembly and the transmission assembly, so as to simplify the structure of the electric assembly 1, reduce the part quantity of the electric assembly 1, improve the integration level of the electric assembly 1, and improve the production efficiency of the electric assembly 1.

Moreover, the motor 200 and the transmission 400 share a box assembly 100. Compared with the related art in which the motor assembly and the transmission assembly are individually disposed, space may be saved, to help shorten an axial distance of the electric assembly 1, so that the structure of the electric assembly 1 is compact and proper, thereby improving the space utilization of the electric assembly 1, and facilitating the disposition of the electric assembly 1; and facilitating mounting and repair of the electric assembly 1, and helping improve reliability and stability of the electric assembly 1.

Moreover, the motor 200 and the transmission 400 share a box assembly 100, and therefore components used for integration of the motor 200 and the transmission 400 may be reduced, thereby helping reduce the weight of the electric assembly 1. For example, when the electric assembly 1 is applied to a vehicle 10, the entire weight of the vehicle 10 may be reduced, thereby helping reduce costs of the vehicle 10, reducing the energy loss of the vehicle 10, improving the operating efficiency of the vehicle 10, and improving the endurance capability of the vehicle 10.

Moreover, the box assembly 100 is disposed, the mounting plate 160 is disposed in the box assembly 100, and clamping needs to be performed only once during assembly, to facilitate assembly and forming of the electric assembly 1, help reduce the error of the electric assembly 1, facilitate mounting and disposition of the motor 200 and the transmission 400, help improve coaxiality and radial mounting accuracy of the motor 200 and the transmission 400, and help improve the operating performance of the electric assembly 1.

Therefore, the electric assembly 1 according to this embodiment of the present disclosure has advantages such as a compact structure and a high integration level.

An electric assembly 1 according to a specific embodiment of the present disclosure is described below with reference to the accompanying drawings.

In some specific embodiments of the present disclosure, as shown in FIG. 1 to FIG. 13, the electric assembly 1 according to this embodiment of the present disclosure includes a box assembly 100, a motor 200, and a transmission 400.

Figure 9:
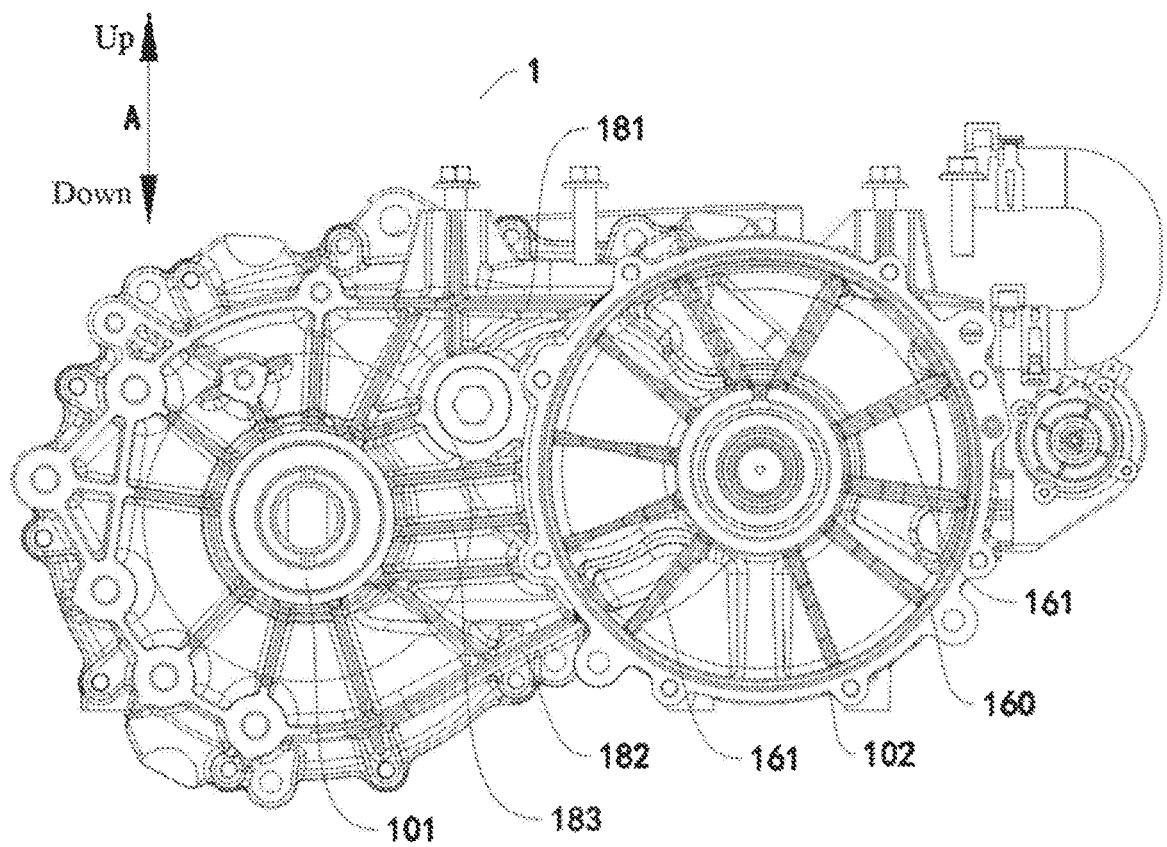
FIG. 9 is a schematic structural diagram of an electric assembly according to an embodiment of the present disclosure.
Figure 10:
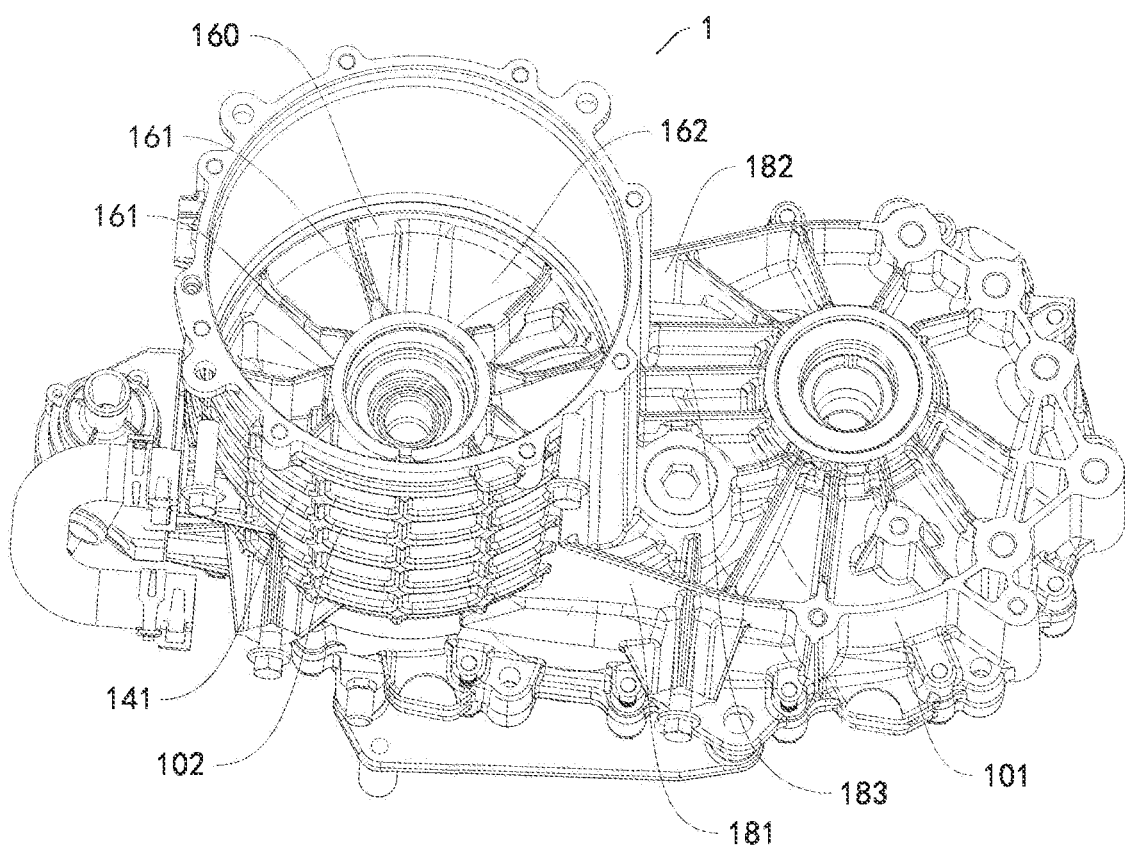
FIG. 10 is a schematic structural diagram of an electric assembly according to an embodiment of the present disclosure.

Specifically, as shown in FIG. 9 and FIG. 10, a surface of the mounting plate 160 facing the motor 200 is provided with ribs. Because the ribs enhance the rigidity of the box assembly 100 and improve the natural frequency, resonance may be prevented from occurring in the electric assembly 1, to help reduce the noise of the electric assembly 1.

More specifically, the ribs divide a space between the mounting plate 160 and the motor 200 into a plurality of cavities 162. In this way, forming of the cavities 162 is facilitated, so as to cool the motor 200 by using air passing through the cavities 162.

In an embodiment, a maximum distance between the motor 200 and the mounting plate 160 is less than a preset distance. It should be understood herein that, the preset distance is a maximum distance making the mounting plate 160 cool the motor 200. For example, the maximum distance between the motor 200 and the mounting plate 160 may be less than 10 millimeters, and is preferably 7.5 millimeters. Because the preset value may be set to a relatively small value, the distance between the motor 200 and the mounting plate 160 is very small. In this way, the motor 200 and the mounting plate 160 may be cooled at a short distance between each other, and after the mounting plate 160 is cooled, the motor 200 can be quickly cooled.

According to an embodiment of the present disclosure, the mounting plate 160 is constructed as a part of a front box 180, and because lubricating liquid in the transmission cools the front box 180, the mounting plate 160 and the box assembly 100, for example, a motor housing 140 and a transmission box 101 may also be cooled. The cavities 162 are formed between the ribs of the mounting plate 160, and therefore, the air flowing through the cavities 162 is also cooled accordingly, and the motor 200 may be cooled by using the air flowing through the cavities 162, to help improve the heat dissipation performance of the electric assembly 1. In short, the lubricating liquid passing through the transmission 400 may cool the motor housing 140 and the housing of the transmission 400 at the same time.

According to another embodiment of the present disclosure, the mounting plate 160 is constructed as a part of the motor housing 140, and because lubricating liquid in the motor cools the motor housing 140, and may also cool the mounting plate 160 and transfer heat through the mounting plate 160, so that the transmission box 101 may also be cooled, thereby cooling the box assembly 100 and improving the entire cooling effect of the electric assembly 1. In short, the lubricating liquid passing through the motor 200 may also cool the motor housing 140 and the transmission 400 at the same time.

Specifically, during rotation of the motor 200, a stress is transferred to the box assembly 100 through a bearing, and ribs are added to the box assembly 100, to help increase rigidity and strength of the box assembly 100, prevent the box assembly 100 from being in contact with a coil of the motor 200, prevent components of the motor 200 from being damaged, and further improve operating reliability and stability of the motor 200.

Figure 12:
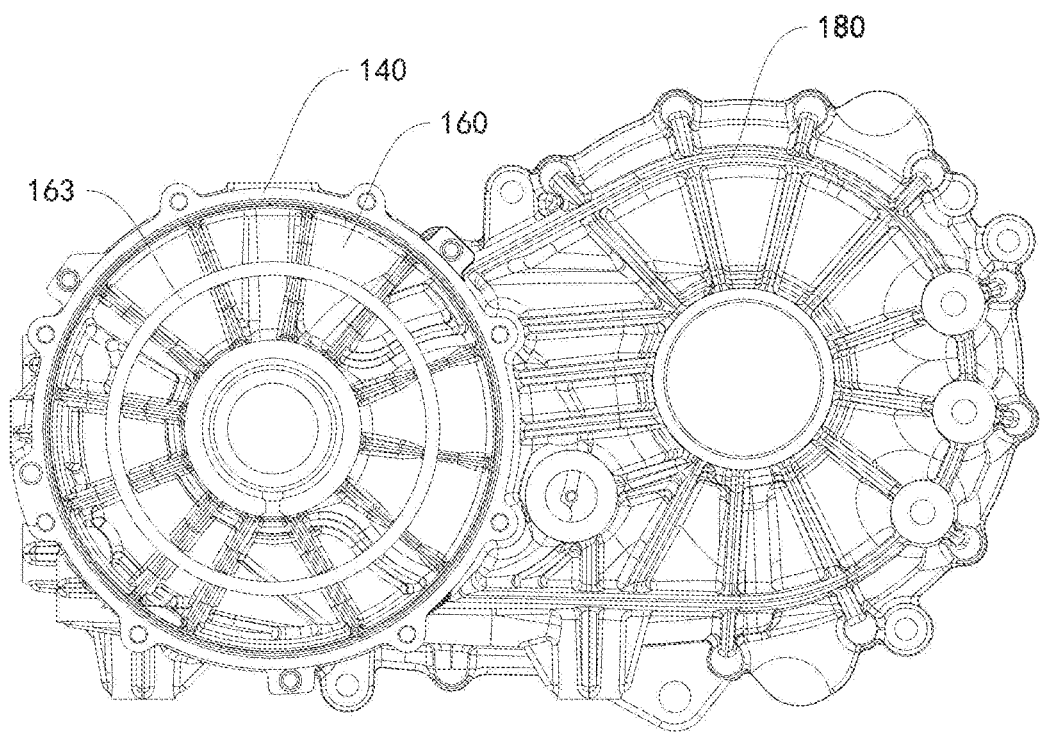
FIG. 12 is a schematic local structural diagram of an electric assembly according to another embodiment of the present disclosure.
Figure 13:
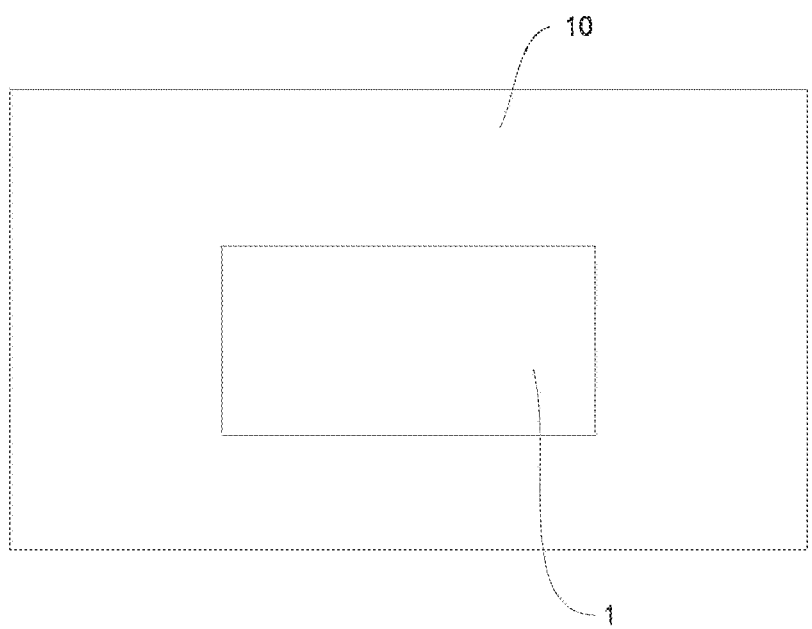
FIG. 13 is a schematic structural diagram of a vehicle according to an embodiment of this application.

According to an embodiment of the present disclosure, as shown in FIG. 12, the ribs include an annular rib 163 extending along a circumferential direction of the motor 200. In this way, rigidity and strength of the box assembly 100 may be improved, the structure stability of the box assembly 100 may be improved, and the heat dissipation capability and the cooling effect of the box assembly 100 may be improved.

According to another embodiment of the present disclosure, as shown in FIG. 10, the ribs include strip-shaped ribs 161 extending along a radial direction of the motor 200, there are a plurality of strip-shaped ribs 161 and the plurality of strip-shaped ribs 161 are spaced apart along a circumferential direction of the mounting plate 160. In this way, a more even force may be applied to the box assembly 100, to further help improve rigidity and strength of the box assembly 100, further help improve noise reduction performance and heat dissipation performance of the electric assembly 1, and improve the cooling effect of the electric assembly 1.

According to another embodiment of the present disclosure, the ribs include an annular rib 163 extending along a circumferential direction of the motor 200 and strip-shaped ribs 161 extending along a radial direction of the motor 200, there are a plurality of strip-shaped ribs 161 and the plurality of strip-shaped ribs 161 are spaced apart along a circumferential direction of the mounting plate 160. In this way, rigidity and strength of the box assembly 100 along the circumferential direction and the radial direction of the motor 200 may be improved at the same time, thereby improving the structure reliability of the box assembly 100, further improving the heat dissipation area of the box assembly 100, and improving heat dissipation and cooling performance of the electric assembly 1.

Specifically, heights of the strip-shaped ribs 161 relative to the mounting plate 160 gradually decrease from a center portion of the mounting plate to a periphery portion of the mounting plate. In this way, the disposition space of the strip-shaped ribs 161 may be reduced, to prevent the strip-shaped ribs 161 from occupying excessive space in the box assembly 100, and further facilitate mounting and disposition of the motor 200 and the transmission 400. On the other hand, the heights of the strip-shaped ribs 161 relative to the mounting plate 160 gradually decrease from a center portion of the mounting plate to a periphery portion of the mounting plate, and the center has a largest height, and may bear a high strength load formed by a bearing on the box assembly 100.

According to an embodiment of the present disclosure, the box assembly 100 includes a transmission box 101 and a motor box 102, the transmission box 101 includes a front box 180 and a rear box 190, the motor box 102 includes a motor housing 140 and a motor backend cover 150, the front box 180 and the motor housing 140 are disposed adjacent to each other, and the mounting plate 160 is constructed as a part of the front box 180 or a part of the motor housing 140. In this way, it is convenient for the electric assembly 1 to become a three-segment structure, forming of the transmission holding cavity 120 and the motor holding cavity 110 is facilitated, and mounting and dismounting of the electric assembly 1 are facilitated. Moreover, the mounting plate 160 is a part of the front box 180 or a part of the motor housing 140, and the mounting plate 160 is integrated on the box assembly 100, so that the structure of the box assembly 100 may be made more proper and compact, and the mounting plate 160 may be cooled by the lubricating liquid of the transmission 400, thereby improving the lubricating and cooling effect of the mounting plate 160.

Further, the front box 180 and the motor housing 140 are integrally formed or detachably connected. In this way, the electric assembly 1 may be a three-segment structure, to facilitate the disposition of the motor 200 and the transmission 400.

According to another embodiment of the present disclosure, as shown in FIG. 9 and FIG. 10, the box assembly 100 includes a transmission box 101 and a motor box 102, the transmission box 101 includes a front box 180 and a rear box 190, the motor box 102 includes a motor frontend cover 170, a motor housing 140 and a motor backend cover 150, and the mounting plate 160 is constructed as a part of the front box 180 or a part of the motor frontend cover 170. In this way, it is convenient for the electric assembly 1 to become a three-segment structure, forming of the transmission holding cavity 120 and the motor holding cavity 110 is facilitated, and mounting and dismounting of the electric assembly 1 are facilitated. Moreover, the mounting plate 160 is a part of the front box 180 or a part of the motor housing 140, and the mounting plate 160 is integrated on the box assembly 100, so that the structure of the box assembly 100 may be made more proper and compact, and the mounting plate 160 may be cooled by the lubricating liquid of the transmission 400, thereby improving the lubricating and cooling effect of the mounting plate 160.

Figure 2:
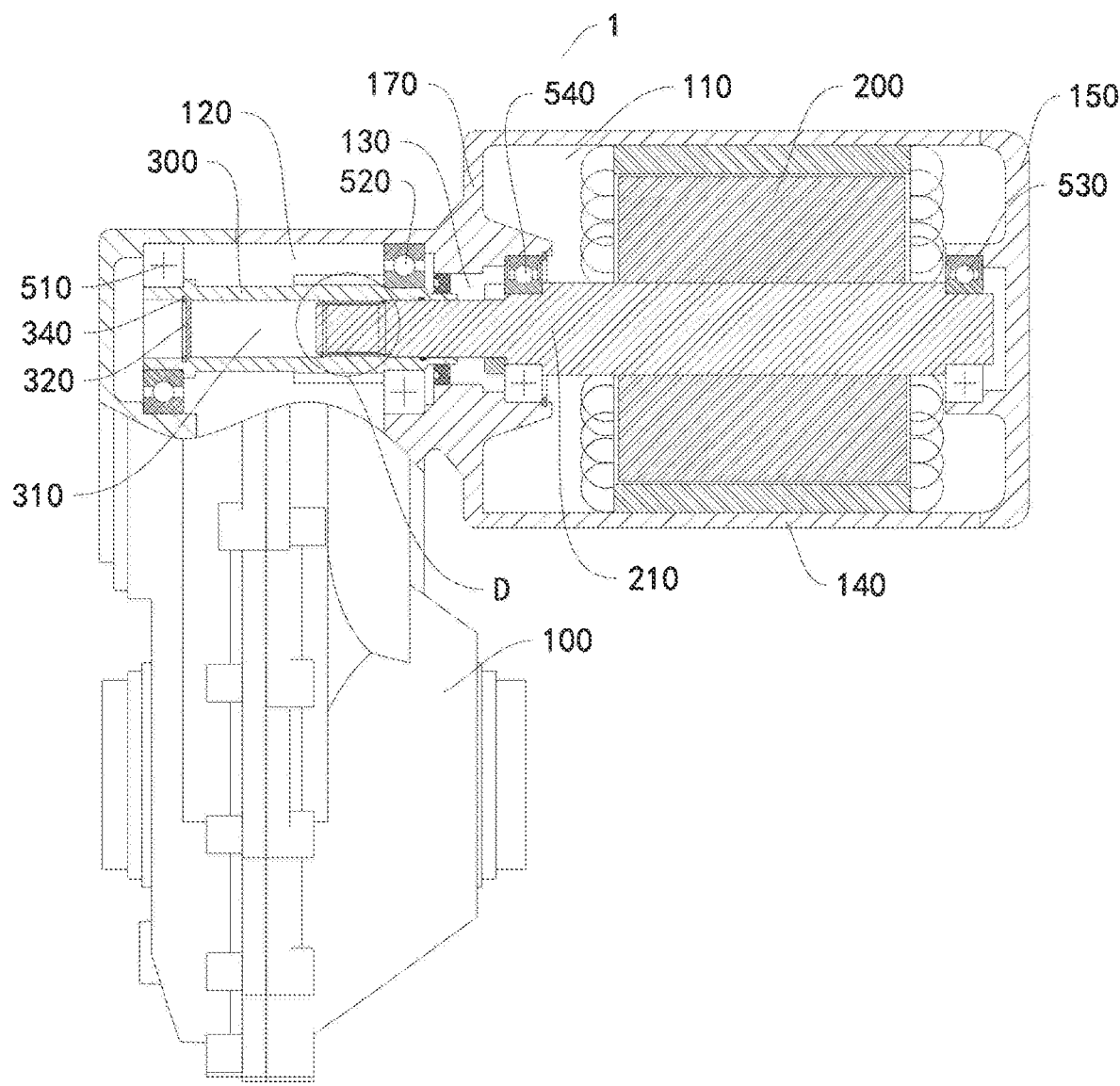
FIG. 2 is a local cross-sectional view of an electric assembly according to an embodiment of the present disclosure.

According to an embodiment of the present disclosure, as shown in FIG. 2, the motor housing 140, the motor frontend cover 170 and the front box 180 are integrally formed or each two of the motor housing 140, the motor frontend cover 170 and the front box 180 are detachably connected. In this way, the structure flexibility of the box assembly may be improved, to facilitate optimization of the structure of the box assembly 100, facilitate reduction of the weight of the box assembly 100, and improve the endurance capability of the electric assembly 1.

According to another embodiment of the present disclosure, the motor frontend cover 170 and the front box 180 are integrally formed, and the motor housing 140 and the motor frontend cover 170 are detachably connected. In this way, simplification of the assembly process of the box assembly 100 is facilitated, thereby improving the assembly efficiency of the box assembly 100.

According to another embodiment of the present disclosure, the motor frontend cover 170 and the motor housing 140 are integrally formed, and the motor frontend cover 170 and the front box 180 are detachably connected. In this way, mutual separation between the transmission box 101 and motor box 102 is facilitated, to help improve the structure flexibility of the box assembly 100.

According to another embodiment of the present disclosure, the motor housing 140 is connected to the motor frontend cover 170 through a bolt, the motor frontend cover 170 is connected to the front box 180 through a bolt, and the motor housing 140 is connected to the motor backend cover 150 through a bolt. In this way, machining and forming of the motor housing 140, the motor frontend cover 170, the front box 180 and the rear box 190 are facilitated, so as to simplify the forming process. Because each of the motor frontend cover 170, the motor housing 140 and the motor backend cover 150 is detachable, the length of the motor 200 may be adjusted. For example, the length of the motor housing 140 as a standard member may be individually adjusted, thereby improving the structure flexibility and the application range of the motor 200.

Specifically, As shown in FIG. 9, one or more of a first connection rib 181, a second connection rib 182 and a third connection rib 183 are connected between an outer surface of the front box 180 and an outer surface of the motor housing 140, the first connection rib 181 is connected between (an up-down direction is shown by an arrow A in FIG. 9) an upper end face of the outer surface of the motor housing 140 and an upper end face of the outer surface of the front box 180, the second connection rib 182 is connected between a lower end face of the outer surface of the motor housing 140 and a lower end face of the outer surface of the front box 180, and the third connection rib 183 is located between the first connection rib 181 and the second connection rib 182. In this way, the strength of connection between the front box 180 and the motor housing 140 may be reinforced, to avoid a case in which a point with weak strength occurs in a connection location between the front box 180 and the motor housing 140 to cause deformation or damage, thereby improving the entire structure performance of the box assembly 100.

Figure 3:
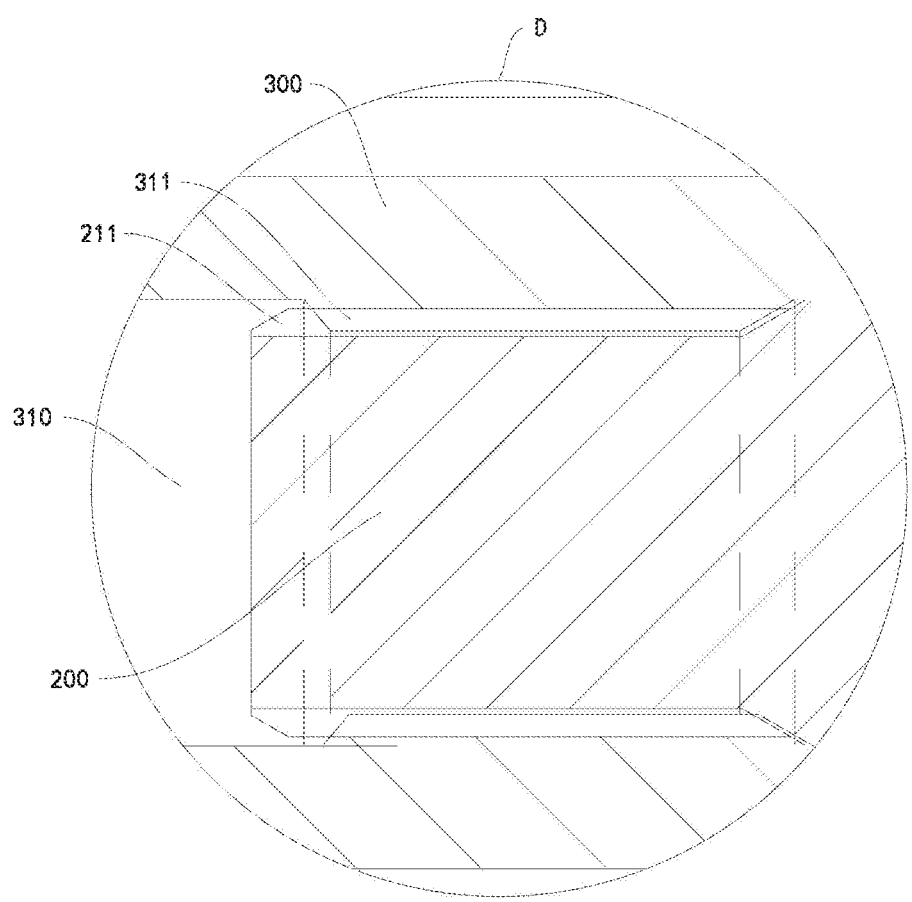
FIG. 3 is an enlarged diagram of a location D in FIG. 2.
Figure 4:
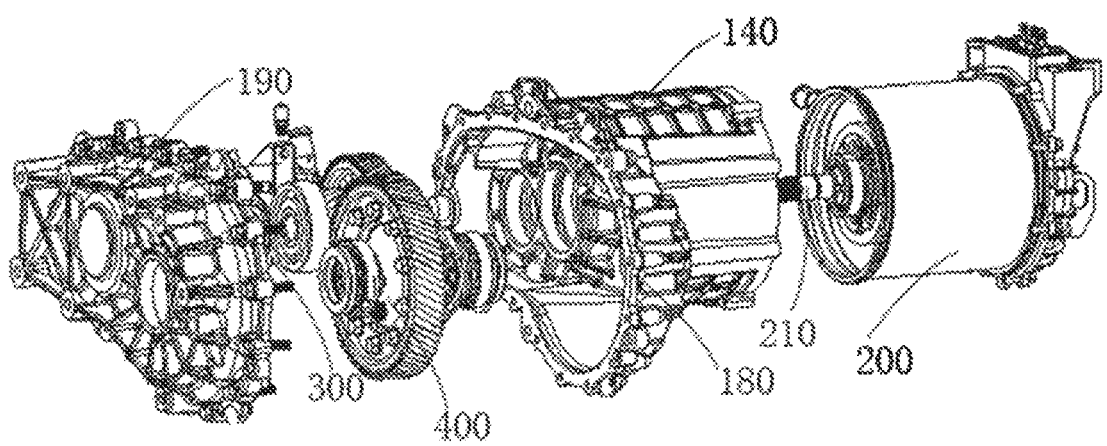
FIG. 4 is an exploded view of an electric assembly according to an embodiment of the present disclosure.
Figure 5:
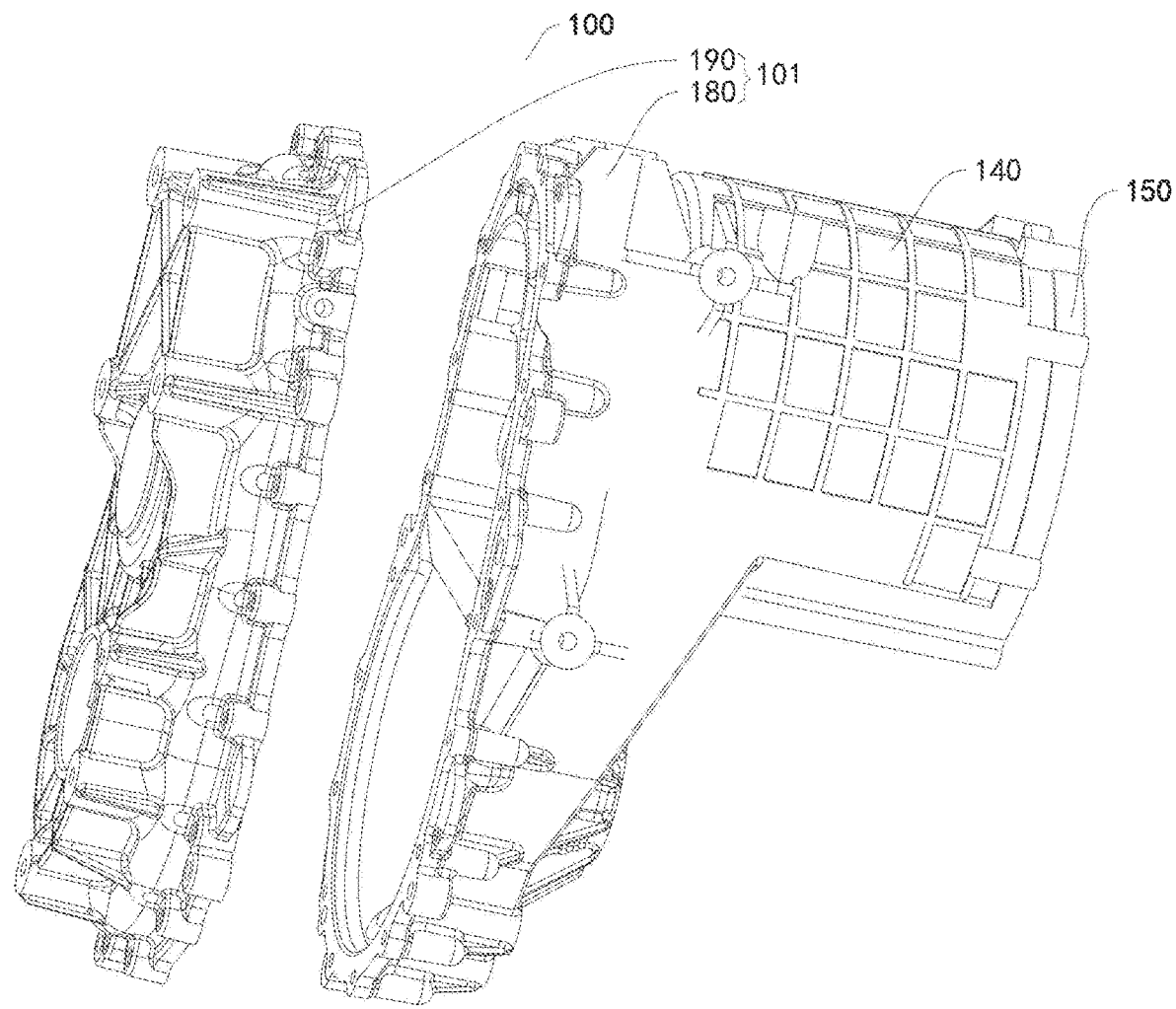
FIG. 5 is an exploded view of a box assembly of an electric assembly according to an embodiment of the present disclosure.

In an embodiment, as shown in FIG. 3, the transmission 400 includes a main shaft 300, the main shaft 300 is power-coupled to a motor shaft 210 of the motor 200, at least one of the motor shaft 210 and the main shaft 300 is threaded through a shaft via-hole 130 and is connected to the other one, and the main shaft 300 is connected to the motor shaft 210 of the motor 200 through splines. In this way, direct transmission between the motor shaft 210 and the main shaft 300 is facilitated, and an additional transmission structure may be left out, to further simplify the structure of the electric assembly 1, improve the integration level of the electric assembly 1, help transfer power outputted by the motor 200 to the transmission 400 in time, help improve the transmission efficiency of the electric assembly 1, and help improve timeliness and accuracy of power transmission of the electric assembly 1. In this way, the main shaft 300 and the motor shaft 210 may be fixed and positioned by using splines, to prevent relative rotation from occurring between the main shaft 300 and the motor shaft 210, facilitate reliable transmission of the electric assembly 1, and help ensure transmission efficiency of the electric assembly 1. In this way, another structure connecting the main shaft 300 and the motor shaft 210 may be left out, thereby further simplifying the structure of the electric assembly 1, and improving the integration level of the electric assembly 1, and because the main shaft 300 and the motor shaft 210 are sleeved over each other, the shaft spacing of the electric assembly 1 is further shortened, so as to further control the size of the electric assembly 1 in the axial direction of the motor shaft 210.

Further, as shown in FIG. 2, the main shaft 300 is provided with a shaft hole 310, an inner circumferential surface of the shaft hole 310 is provided with inner splines 311, an outer circumferential surface of the motor shaft 210 is provided with outer splines 211, the motor shaft 210 of the motor 200 is matched in the shaft hole 310 and the inner splines 311 match the outer splines 211. In this way, machining of the inner splines 311 is facilitated, to help improve machining precision of the inner splines 311. Through the matching between the inner splines 311 and the outer splines 211, transmission connection between the main shaft 300 and the motor shaft 210 may be implemented, and reliable positioning between the main shaft 300 and the motor shaft 210 may be implemented, to further prevent relative rotation from occurring between the main shaft 300 and the motor shaft 210. Moreover, the motor 200 is a three-segment motor, the main shaft 300 and the motor shaft 210 are sleeved over each other, and the length of the motor 200 may be adjusted according to a requirement, to help change torque and power of the motor 200, and help improve compatibility of the motor 200.

Specifically, the shaft hole 310 runs through the main shaft 300 along an axial direction of the main shaft 300, an oil baffle 320 is matched in the shaft hole 310, the oil baffle 320, an inner circumferential wall of the shaft hole 310 and the motor shaft 210 jointly define an oil storage cavity 330, the oil storage cavity 330 is filled with lubricating oil, and the oil baffle 320 is provided with an air vent 350. In this way, the disposition of the lubricating oil is facilitated, and the lubricating oil in the shaft hole 310 can be effectively prevented from leaking, to play a role of protecting a spline lubricating system. In this way, the main shaft 300 may have an oil storage function, the splines may be lubricated and cooled, the air vent 350 may discharge generated gas at the right time, and the disposition of the shaft hole 310 running through along the axial direction of the main shaft 300 may avoid a case in which gas exists in the shaft hole 310 to affect mounting of the motor shaft 210 and the main shaft 300.

More specifically, a seal retainer ring is matched between the oil baffle 320 and the shaft hole 310 and between the outer circumferential surface of the motor shaft 210 and the inner circumferential surface of the shaft hole 310. In this way, it is convenient to seal the oil storage cavity 330, and the lubricating oil in the oil storage cavity 330 may be prevented from leaking, thereby improving the seal effect of the oil storage cavity 330.

Specifically, as shown in FIG. 2, the electric assembly 1 further includes a plurality of bearings, and the plurality of bearings are respectively sleeved over the motor shaft 210 and the main shaft 300 and are spaced apart along the axial direction of the motor shaft 210 and the main shaft 300. In this way, smooth rotation of the motor shaft 210 and the main shaft 300 is facilitated, to help improve reliability and accuracy of rotation of the motor shaft 210 and the main shaft 300.

Figure 8:
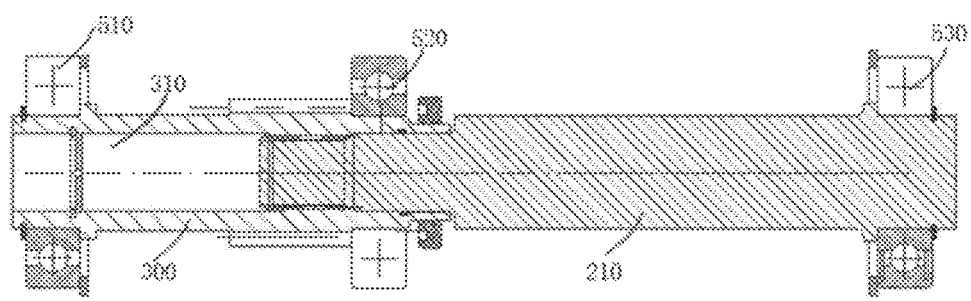
FIG. 8 is a local cross-sectional view of an electric assembly according to another embodiment of the present disclosure.

According to an embodiment of the present disclosure, as shown in FIG. 8, the plurality of bearings include a first bearing 510, a second bearing 520 and a third bearing 530, the first bearing 510 and the second bearing 520 are respectively disposed adjacent to two ends of the main shaft 300, and the third bearing 530 is disposed adjacent to one end of the motor shaft 210 away from the main shaft 300. In this way, the disposition of the motor shaft 210 and the main shaft 300 is facilitated, to further facilitate smooth rotation of the motor shaft 210 and the main shaft 300, and the quantity of the bearings may be reduced, to reduce costs of the electric assembly 1.

Specifically, the third bearing 530 is disposed between one end of the motor shaft 210 away from the transmission 400 and the box assembly 100, the first bearing 510 is disposed between one end of the main shaft 300 away from the motor 200 and the box assembly 100, and the second bearing 520 is disposed between at least one of one end of the motor 200 close to the main shaft 300 and one end of the main shaft 300 close to the motor shaft 210 and the box assembly 100. In this way, the force applied to the motor shaft 210 and the main shaft 300 may be more balanced, to help improve the operating performance of the electric assembly 1.

In an embodiment, the second bearing 520 is sleeved over the main shaft 300 and is located on an overlap between the main shaft 300 and the motor shaft 210 in the axial direction. In this way, the second bearing 520 may be used for supporting the main shaft 300 and the motor shaft 210, to ensure the disposition reliability of the main shaft 300 and the motor shaft 210. Because the overlap between the main shaft 300 and the motor shaft 210 in the axial direction is a place on which rotation forms stress concentration, effective supporting of the second bearing 520 may prevent the main shaft 300 and the motor shaft 210 from being broken, thereby improving the operating performance of the main shaft 300 and the motor shaft 210.

Figure 7:
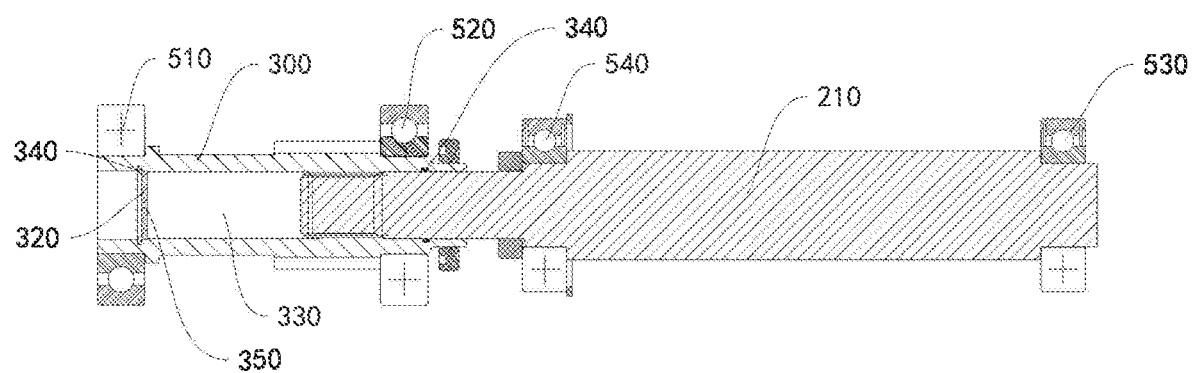
FIG. 7 is a local cross-sectional view of an electric assembly according to an embodiment of the present disclosure.

According to another embodiment of the present disclosure, as shown in FIG. 7, the electric assembly 1 further includes a fourth bearing 540, where the fourth bearing 540 is sleeved over the motor shaft 210 and is located between the motor shaft 210 and the motor housing. In this way, the fourth bearing 540 may be used for reinforcing supporting on the motor shaft 210, thereby further improving the disposition reliability of the motor shaft 210.

Specifically, the fourth bearing 540 is located between the main shaft 300 and a stator of the motor 200 in the axial direction of the motor shaft 210. In this way, the force applied to the main shaft 300 and the motor 200 may be more even, to help improve reliability and stability of power transfer between the main shaft 300 and the motor 200.

Figure 11:
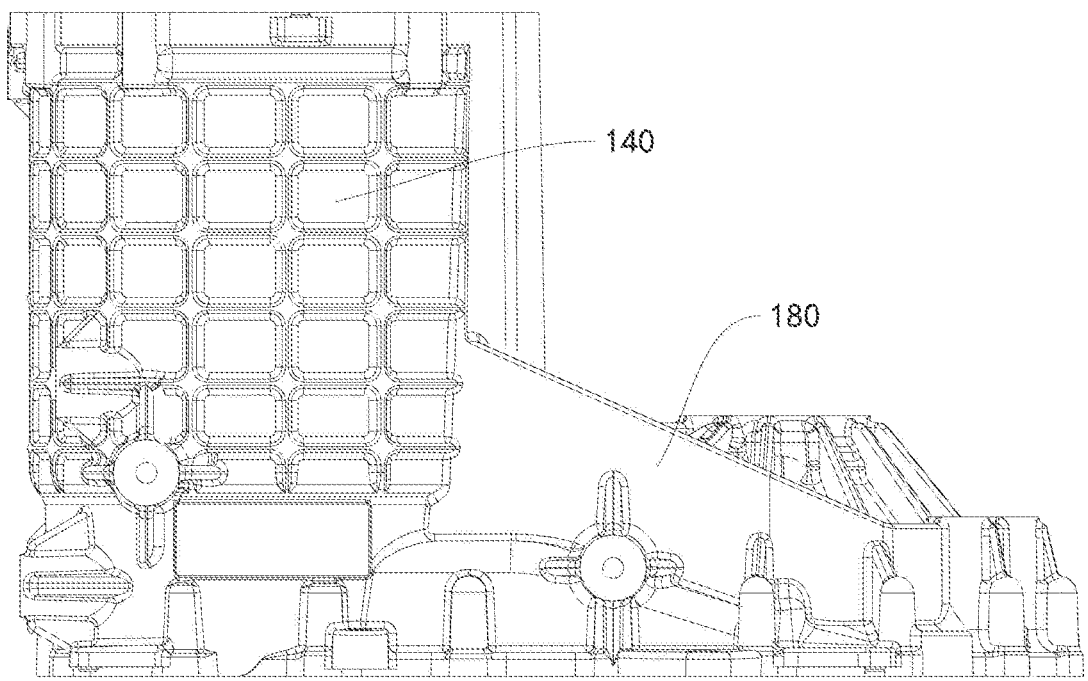
FIG. 11 is a schematic local structural diagram of an electric assembly according to another embodiment of the present disclosure.

In an embodiment, as shown in FIG. 11, an outer surface of the motor housing 140 is provided with reinforcing ribs 141 arranged along the outer surface of the motor housing 140. In this way, it is convenient to improve the strength of the motor housing 140, and the surface area of the motor housing 140 may be increased, thereby improving the heat dissipation performance of the motor housing 140.

Specifically, after the motor backend cover 150 is dismounted, the transmission holding cavity 120 may be opened. In this way, it may be convenient to replace and maintain the transmission 400.

Further, an end face of the motor holding cavity 110 away from one end of the transmission holding cavity 120 may be opened, and after the motor 200 is mounted to the box assembly 100, the motor backend cover 150 covers the motor holding cavity 110.

In an embodiment, the motor housing 140 and the motor backend cover 150 are mounted through bolts and the front box 180 and the rear box 190 are mounted through bolts. In this way, reliability and stability of the fixed connection between the motor housing 140 and the motor backend cover 150 and between the front box 180 and the rear box 190 may be ensured, and when the electric assembly 1 has a fault, the box assembly 100 may be quickly dismounted, to further facilitate maintenance of the electric assembly 1.

Specifically, as shown in FIG. 2, the first bearing 510 is located on the motor backend cover 150, the second bearing 520 and the fourth bearing 540 are respectively disposed at two ends of the shaft via-hole 130, and the third bearing 530 is located on an end face of the motor holding cavity 110 away from the transmission holding cavity 120. In this way, the force applied to the main shaft 300 and the motor 200 may be more even, to further help improve the structure stability of the electric assembly 1.

More specifically, the main shaft 300 is provided with a first main shaft positioning slot and a second main shaft positioning slot, the first bearing 510 is matched in the first main shaft positioning slot, and the second bearing 520 is matched in the second main shaft positioning slot. The motor shaft 210 is provided with a third motor shaft positioning slot and a fourth motor shaft positioning slot, the third bearing 530 is matched in the third motor shaft positioning slot, and the fourth bearing 540 is matched in the fourth motor shaft positioning slot. The box assembly 100 is provided with box positioning slots matching the bearings. In this way, the positioning slots may be used for positioning the bearings, to facilitate reliable disposition of the bearings, and help improve location accuracy of the bearings.

In an embodiment, the electric assembly 1 can be directly mounted to the chassis of the vehicle 10 through a suspension mounting point on the box assembly 100. In this way, mounting of the electric assembly 1 is further facilitated, improvement of the mounting efficiency of the vehicle 10 is facilitated, and the mounting costs of the vehicle 10 are reduced.

Figure 6:
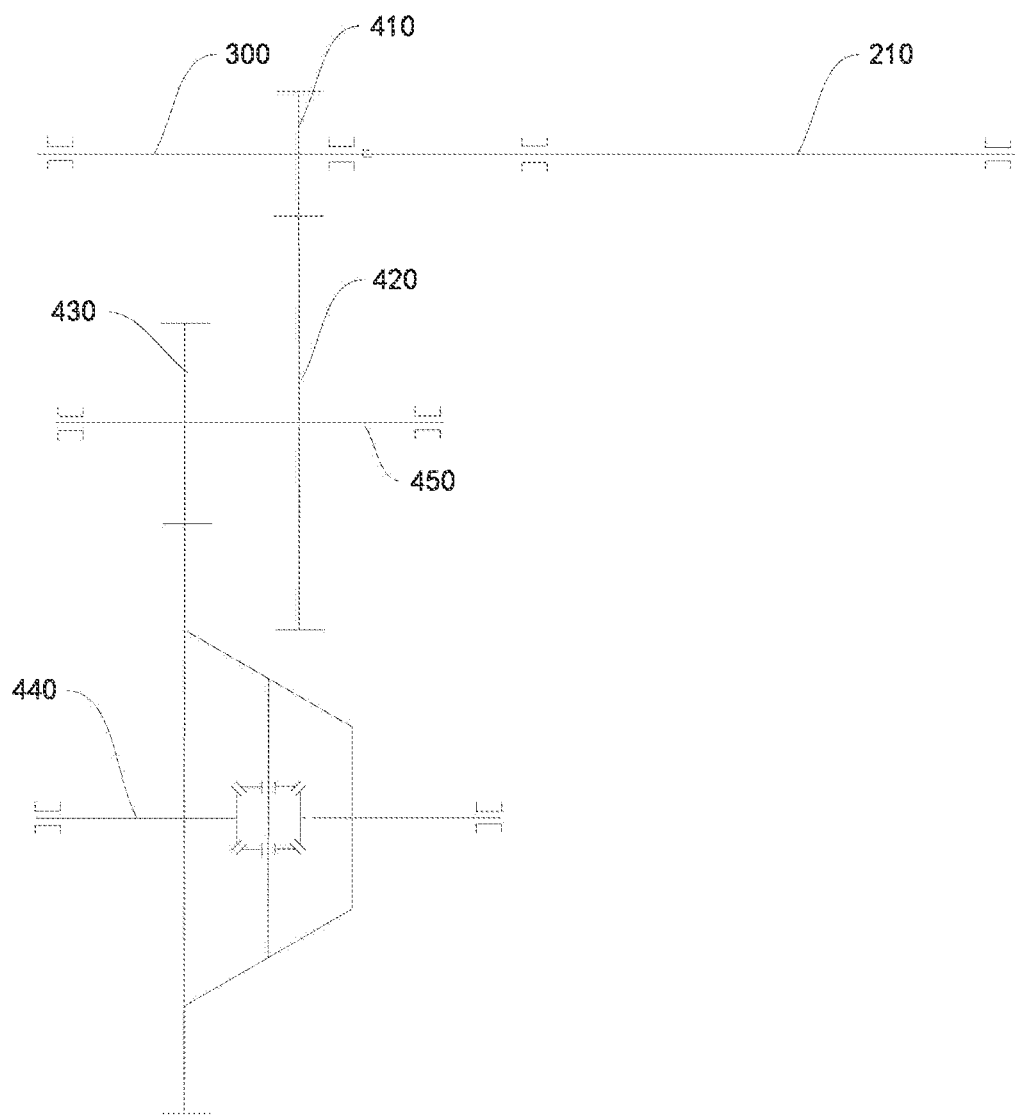
FIG. 6 is a schematic local structural diagram of an electric assembly according to an embodiment of the present disclosure.

Specifically, as shown in FIG. 6, the transmission 400 includes a differential assembly 440, a first gear 410, a second gear 420, a third gear 430 and a transmission shaft 450, the first gear 410 is sleeved over the main shaft 300, the second gear 420 and the third gear 430 are sleeved over the transmission shaft 450, the first gear 410 is meshed with the second gear 420, and the third gear 430 is meshed with the differential assembly 440. In this way, it is convenient for the transmission 400 to implement speed change transmission.

In an embodiment, as shown in FIG. 1, the box assembly 100 includes the cylindrical motor housing 140 and the front box assembly 180 of the transmission connected to the motor housing 140, the motor holding cavity 110 is disposed in the motor housing 140, the transmission holding cavity 120 is disposed between the front box 180 and the rear box 190, and the box of the transmission protrudes outward from the outer circumferential surface of the motor housing 140. In this way, it is convenient for the box assembly 100 to protect the electric assembly 1.

Specifically, as shown in FIG. 6, the axial line of the motor shaft 210 is parallel to those of the main shaft 300, the transmission shaft 450 and the differential assembly 440. In this way, it is convenient for the electric assembly 1 to smoothly transfer power.

A vehicle 10 according to an embodiment of the present disclosure is described below. The vehicle 10 according to this embodiment of the present disclosure includes the electric assembly 1 according to the foregoing embodiment of the present disclosure.

In the vehicle 10 according to this embodiment of the present disclosure, the electric assembly 1 according to the foregoing embodiment of the present disclosure is used, where the electric assembly has advantages such as a compact structure and a high integration level.

Other configurations and operations of the vehicle 10 according to the embodiments of the present disclosure are known to those of ordinary skill in the art and will not be described in detail herein.

In the description of the present disclosure, it should be understood that, orientations or position relationships indicated by terms such as "center", "longitudinal", "transverse", "length", "width", "thickness", "up", "down", "front", "rear", "left", "right", "vertical", "horizontal", "top", "bottom", "inner", "outer", "clockwise", "counterclockwise", "axial", "radial", and "circumferential" are orientations or position relationship shown based on the accompanying drawings, and are merely used for describing the present disclosure and simplifying the description, rather than indicating or implying that the apparatus or element should have a particular orientation or be constructed and operated in a particular orientation, and therefore, should not be construed as a limitation on the present disclosure. Moreover, features modified by "first" and "second" may explicitly or implicitly include one or more features. In descriptions of the present disclosure, "a plurality of" means two or more, unless otherwise stated.

In the descriptions of the present disclosure, it should be noted that, unless otherwise clearly specified and defined, terms such as "mounting", "interconnection", and "connection" shall be understood in a broad sense, for example, may be a fixing connection, a detachable connection, an integral connection, a mechanical connection, an electrical connection, a direct connection, an indirect connection by using an intermediate medium, and communication between interiors of two components. A person of ordinary skill in the art may understand specific meanings of the foregoing terms in the present disclosure according to a specific situation.

In the descriptions of this specification, descriptions such as reference terms "an embodiment", "some embodiments", "exemplary embodiment", "example", "specific example", or "some examples" indicate that specific features, structures, materials, or characteristics described with reference to embodiments or examples are included in at least one embodiment or example of the present disclosure. In this specification, exemplary descriptions of the foregoing terms do not necessarily refer to a same embodiment or example. In addition, the described specific feature, structure, material, or characteristic may be combined in a proper manner in any one or more embodiments or examples.

Although the embodiments of the present disclosure have been shown and described, a person skilled in the art can understand that the above embodiments cannot be construed to limit the present disclosure, and changes, alternatives, and modifications can be made in the embodiments without departing from the principle and the purpose of the present disclosure.

What is claimed is:

1. An electric assembly, comprising:
a box assembly, wherein a mounting plate is disposed in the box assembly, the mounting plate divides a space within the box assembly into a motor holding cavity and a transmission holding cavity that are arranged along an axial direction of a motor shaft, and the mounting plate has a shaft via-hole making the motor holding cavity and the transmission holding cavity be in communication with each other;
a motor, wherein the motor is disposed in the motor holding cavity; and
a transmission, wherein the transmission is disposed in the transmission holding cavity, and the motor is power-coupled to the transmission,
wherein
at least one of a surface of the mounting plate facing the motor and a surface of the mounting plate facing the transmission is provided with ribs,
the ribs comprise a plurality of strip-shaped ribs extending along a radial direction of the motor, and
heights of at least a part of the strip-shaped ribs relative to the mounting plate gradually decrease from a center portion of the mounting plate to a periphery portion of the mounting plate.

2. The electric assembly according to claim 1, wherein
the ribs divide a space between the mounting plate and the motor into a plurality of cavities, and
a maximum distance between the motor and the mounting plate is no more than a preset distance such that the mounting plate cools the motor.

3. The electric assembly according to claim 2, wherein the maximum distance between the motor and the mounting plate is no more than about 10 mm.

4. The electric assembly according to claim 2, wherein the maximum distance between the motor and the mounting plate is no more than about 7.5 mm.

5. The electric assembly according to claim 1, wherein the ribs comprise an annular rib extending along a circumferential direction of the motor.

6. The electric assembly according to claim 1, wherein the strip-shaped ribs are spaced apart along a circumferential direction of the mounting plate.

7. The electric assembly according to claim 1, wherein
the box assembly comprises a transmission box and a motor box,
the transmission box comprises a front box and a rear box,
the motor box comprises a motor housing and a motor backend cover,
the front box and the motor housing are disposed adjacent to each other,
the mounting plate is a part of the front box or a part of the motor housing, and
the front box and the motor housing are integrally formed or detachably connected.

8. The electric assembly according to claim 7, wherein
one or more of a first connection rib, a second connection rib and a third connection rib are connected between an outer surface of the front box and an outer surface of the motor housing,
the first connection rib is connected between an upper end face of the outer surface of the motor housing and an upper end face of the outer surface of the front box,
the second connection rib is connected between a lower end face of the outer surface of the motor housing and a lower end face of the outer surface of the front box, and
the third connection rib is located between the first connection rib and the second connection rib.

9. The electric assembly according to claim 1, wherein
the box assembly comprises a transmission box and a motor box,
the transmission box comprises a front box and a rear box,
the motor box comprises a motor frontend cover, a motor housing, and a motor backend cover, and
the mounting plate is a part of the front box or a part of the motor frontend cover.

10. The electric assembly according to claim 9, wherein the motor frontend cover and the front box are integrally formed, and the motor housing and the motor frontend cover are detachably connected.

11. An electric assembly, comprising:
a box assembly, wherein a mounting plate is disposed in the box assembly, the mounting plate divides a space within the box assembly into a motor holding cavity and a transmission holding cavity that are arranged along an axial direction of a motor shaft, and the mounting plate has a shaft via-hole making the motor holding cavity and the transmission holding cavity be in communication with each other;
a motor, wherein the motor is disposed in the motor holding cavity;
a transmission, wherein the transmission is disposed in the transmission holding cavity, and the motor is power-coupled to the transmission; and
a bearing, wherein the bearing is sleeved over the motor shaft and is located between the motor shaft and a motor housing.

12. The electric assembly according to claim 11, wherein the bearing is located between a main shaft of the transmission and a stator of the motor in the axial direction of the motor shaft.

13. The electric assembly according to claim 12 further comprising: a plurality of bearings comprising the bearing, wherein
the plurality of bearings are respectively sleeved over the motor shaft and the main shaft and are spaced apart along the axial direction of the motor shaft,
the plurality of bearings comprise a first bearing, a second bearing, a third bearing, and a fourth bearing,
the first bearing and the second bearing are respectively disposed adjacent to two ends of the main shaft,
the third bearing is disposed adjacent to one end of the motor shaft away from the main shaft, and
the fourth bearing is sleeved over the motor shaft and is located between the motor shaft and the motor housing in the axial direction of the motor shaft, and the fourth bearing is located between the main shaft of the transmission and a stator of the motor.

14. The electric assembly according to claim 13, wherein:
the third bearing is disposed between the box assembly and one end of the motor shaft away from the transmission,
the first bearing is disposed between the box assembly and one end of the main shaft away from the motor,
the second bearing is disposed between the box assembly and at least one of one end of the motor shaft close to the main shaft and one end of the main shaft close to the motor shaft, and
the second bearing is sleeved over the main shaft and is located on an overlap between the main shaft and the motor shaft in the axial direction of the motor shaft.

15. The electric assembly according to claim 11, wherein an outer surface of the motor housing is provided with reinforcing ribs arranged along the outer surface of the motor housing.

16. A vehicle, comprising an electric assembly, wherein the electric assembly comprises:
- a box assembly, wherein a mounting plate is disposed in the box assembly, the mounting plate divides a space within the box assembly into a motor holding cavity and a transmission holding cavity that are arranged along an axial direction of a motor shaft, and the mounting plate has a shaft via-hole making the motor holding cavity and the transmission holding cavity be in communication with each other;
- a motor, wherein the motor is disposed in the motor holding cavity; and
- a transmission, wherein the transmission is disposed in the transmission holding cavity, and the motor is power-coupled to the transmission, wherein at least one of a surface of the mounting plate facing the motor and a surface of the mounting plate facing the transmission is provided with ribs, the ribs comprise a plurality of strip-shaped ribs extending along a radial direction of the motor, and heights of at least a part of the strip-shaped ribs relative to the mounting plate gradually decrease from a center portion of the mounting plate to a periphery portion of the mounting plate.

17. The vehicle according to claim 16, wherein
the ribs divide a space between the mounting plate and the motor into a plurality of cavities, and
a maximum distance between the motor and the mounting plate is no more than a preset distance such that the mounting plate cools the motor.

18. The vehicle according to claim 16, wherein the ribs comprise an annular rib extending along a circumferential direction of the motor.

19. The vehicle according to claim 16, wherein the strip-shaped ribs are spaced apart along a circumferential direction of the mounting plate.

20. The vehicle according to claim 16, wherein
the box assembly comprises a transmission box and a motor box,
the transmission box comprises a front box and a rear box,
the motor box comprises a motor housing and a motor backend cover,
the front box and the motor housing are disposed adjacent to each other,
the mounting plate is a part of the front box or a part of the motor housing, and
the front box and the motor housing are integrally formed or detachably connected.

* * * * *